Dec. 23, 1947.   A. V. BEDFORD ET AL   2,433,194
SYNCHRONOUS DRIVE FOR LOADS
Filed April 29, 1943

Inventors
Alda V. Bedford
& Carl R. Meneley
By
C.D. Tuska
Attorney

Patented Dec. 23, 1947

2,433,194

UNITED STATES PATENT OFFICE 2,433,194

SYNCHRONOUS DRIVE FOR LOADS

Alda V. Bedford and Carl A. Meneley, Princeton, N. J., assignors to Radio Corporation of America, a corporation of Delaware Application April 29, 1943, Serial No. 485,036

10 Claims. (Cl. 318—8)

This invention relates to motor speed control and more particularly to the control of electric motors so as to drive an output shaft at constant speed under the control of a quartz crystal or other constant frequency standard.

One method of providing such a control is to amplify the output of a crystal controlled oscillator to an extent sufficient to provide the required power. The amplified energy is applied to a synchronous motor. If substantial mechanical power is required, it is found that this method is impractical. For example, a quarter horse power synchronous motor may require an amplifier including tubes having a total rating of several kilowatts.

It is the principal object of the present invention to provide an improved method of and means for driving a mechanical load at constant speed.

Another object is to provide an improved method of and means for driving a mechanical load by means of two variable speed motors, controlling the speed of one of said motors so as to compensate variations in the speed of the other.

A further object is to provide an improved method of and means for driving a shaft at constant speed by controlling only a relatively small proportion of the power applied thereto.

Figure 1:
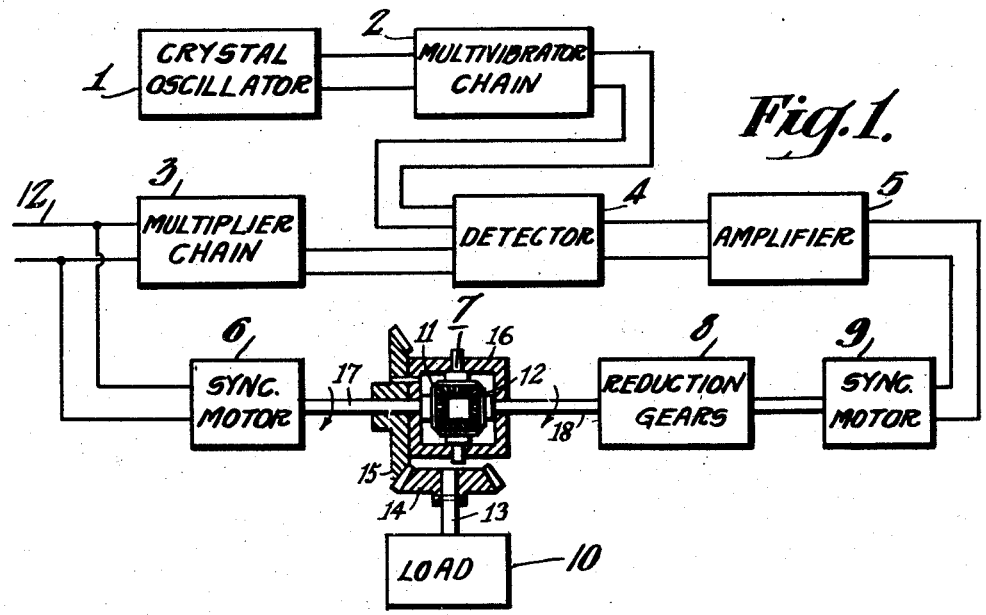
Figure 2:
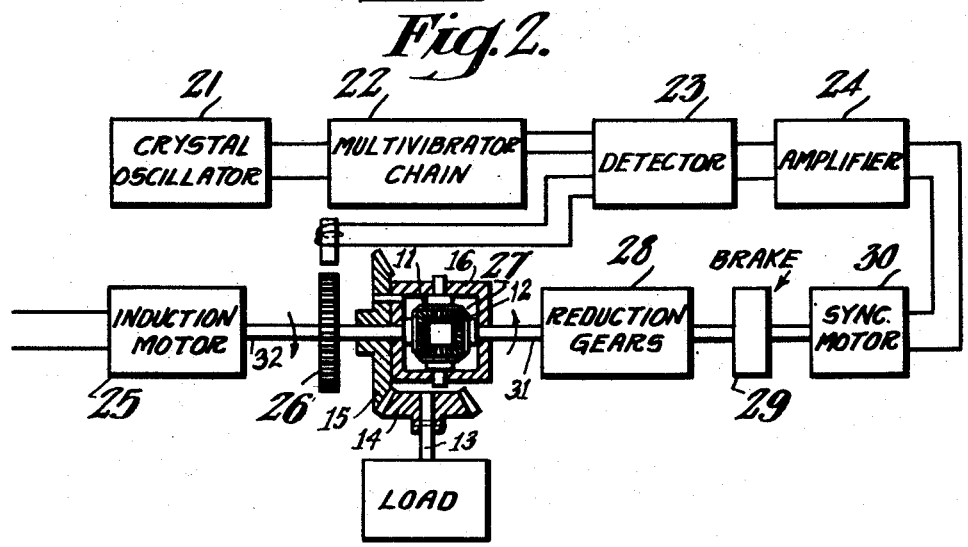

These and other objects will become apparent to those skilled in the art upon consideration of the following description with reference to the accompanying drawing of which:

Figure 1 is a schematic block diagram of a preferred embodiment of the invention, and Figure 2 is a schematic block diagram of a modification of the system of Figure 1.

According to the present invention, the load shaft is driven at approximately the proper speed by an induction motor or any other desired source providing a fairly constant speed. A second device is arranged to add a correction to bring the speed of the output shaft to the exact value corresponding to the frequency of the control voltage. Thus, the major portion of the energy is provided by the unregulated power source and a relatively small motor is controlled to compensate for variations in the speed of the unregulated motor. This arrangement makes it possible to provide a relatively large amount of power at constant speed by controlling the speed of the relatively small motor.

Referring to Figure 1, a synchronous motor 6 is connected to an approximately constant frequency source such as the A.-C. line 12. The shaft of the motor 6 is connected through a shaft 17 to the mitre gear 11 of a differential 7.

A second synchronous motor 9 is coupled through reduction gearing 8 and a shaft 18 to the mitre gear 12 of the differential 7. The output shaft 13 of the differential 7 is connected through bevel gears 14 and 15 to the differential spider member 16 and to the load 10. The power rating of the motor 6 is much greater than that of the motor 9. For example, the motor 9 may be rated at $1/100$ horse power and the motor 6 may be rated at one-quarter horse power. The ratio of the reduction gear 8 is, for example, 16–1.

A crystal controlled oscillator 1 is connected through a frequency divider such as a multivibrator chain 2 to a detector 4. A multiplier chain 3 is connected between the A.-C. line 12 and the input circuit of the detector 4. The output circuit of the detector 4 is connected through an amplifier 5 to the synchronous motor 9. The crystal 1 may operate at any convenient frequency, for example 110,160 cycles. The multivibrator chain 2 is designed to provide a frequency division of 108, providing an output of 1020 cycles. The multiplier chain 3 is designed to provide a multiplication of 16. The output of the multiplier chain 3 is nominally 960 cycles.

The operation of the described system is as follows:

The 1020 cycle output of the multivibrator chain 1 and the 960 cycle output of the multiplier chain 3 are combined in the detector 4 to provide an output having a nominal frequency of 1020—960 or 60 cycles.

This 60-cycle voltage is amplified and applied to the synchronous motor 9, causing it to run at 1800 R. P. M. Assuming that the frequency of the A.-C. supply is exactly 60 cycles, the motor 6 will also run at 1800 R. P. M. The output of the reduction gear 8 is 1800÷16 or 112.5 R. P. M. The shafts 17 and 18 are driven in the same direction, as indicated by the arrows. Thus the differential 7 operates to add their motions, so that the load shaft is driven at 1800+112.5, or 1912.5 R. P. M. Now if frequency of the A.-C. supply changes to, for example, 59 cycles, the motor 6 will run at $59/60$ of 1800 R. P. M., or 1770 R. P. M. The output frequency of the multiplier chain 3 will decrease to 944 cycles. This causes the output frequency of the detector 4 to become 1020—944 or 76 cycles. The synchronous motor 9 runs at $76/60$ of 1800, or 2280 R. P. M. The output of the reduction gear 8 is $\frac{1}{16}$ of 2280, or 142.5 R. P. M. The load shaft runs at 1770 plus 142.5 or 1912.5 R. P. M. Thus the change in frequency of the energy supplied by the line 12 is completely compensated and the load is driven at the same speed as before. An increase in line frequency will be similarly compensated. The system will operate as described over the range throughout which the multiplier chain provides 16-1 frequency multiplication.

Referring to Figure 2, an induction motor 25 may be employed instead of the synchronous motor 6 of Figure 1. In this arrangement it is necessary to provide a signal having a frequency proportional to the speed of the induction motor. A tone wheel 26 is connected to the shaft of the motor 25. The tone wheel 26 may comprise a magnetic rotor provided with a number of teeth similar to a gear, and a small pickup magnet and coil supported adjacent to the teeth. The tone wheel pickup is connected to the input circuit of a detector 23. The tone wheel is designed to provide an output having a frequency of 1140 cycles when the induction motor 25 is running at 1710 R. P. M. A crystal oscillator 21 is designed to provide an output frequency of 116.640 cycles. A multivibrator chain 22 is connected between the crystal oscillator and the input circuit of the detector 23. The output frequency of the multivibrator chain is 1080 cycles.

The output circuit of the detector 23 is connected to an amplifier 24. The amplifier 24 is connected to a synchronous motor 30. The shaft of the synchronous motor 30 is connected through a 20-1 reduction gear 28 and a shaft 31 to a differential 27. The induction motor 25 is also connected through a shaft 32 to the differential 27. The connections of the motors 25 and 30 to the differential 27 are the same as those of the motors 6 and 9 to the differential 7 in Figure 1, with the exception that the motors 25 and 30 rotate in such directions that the shafts 31 and 32 rotate oppositely, so that the speed of the output shaft is the difference of their speeds. A brake 29 is provided on the shaft of the motor 30.

The operation of the system in Figure 2 is similar to that of Figure 1, with the exception that the speed correction is subtracted from, rather than added to the speed of the main motor. Thus, if the load is to be driven at 1620 R. P. M., the induction motor runs at a nominal speed of 1710 R. P. M. and the synchronous motor drives the differential at a speed of 90 R. P. M. If the speed of the induction motor increases, the speed of the synchronous motor is automatically increased by the same amount so that the speed difference remains constant. Thus the synchronous motor 30 functions as a variable speed brake, holding back the differential 27 by the proper amount to maintain the speed of the load shaft. The motor 30 may be assisted in this action by the brake 29 which may be adjusted to absorb the major portion of the required torque.

One advantage of the system of Fig. 2 is that hunting of the load is reduced to a very low value. No hunting is introduced by the induction motor 25 since it is not the type of device that hunts, and any hunting introduced by the synchronous motor 30 is reduced in amplitude in proportion to the ratio of reduction gear 28. Although specific embodiments of the invention have been described, it will be apparent that numerous modifications are possible without departing from the scope of the invention. For example, the crystal oscillator and multivibrator chain might be replaced by a low frequency source such as a motor driven tuning fork. The induction motor of the modification shown in Figure 2 might be replaced by a shunt D.-C. motor or a gasoline engine, or any other source of relatively constant speed energy.

We claim as our invention:

1. A system for driving a mechanical load at constant speed comprising a constant frequency source of voltage, a main source of mechanical energy subject to variations in speed, means for producing an alternating voltage having a frequency proportional to the speed of said main source, a detector connected to respond to said constant frequency voltage and said variable frequency voltage and which produces a difference frequency voltage, a synchronous motor, means for energizing said synchronous motor with said difference frequency voltage, and a differential with two input shafts connected to said main source of mechanical energy and to said synchronous motor respectively and an output shaft connected to said mechanical load.

2. A system for driving a mechanical load at constant speed including a differential with an output shaft connected to said load, a synchronous motor providing the primary source of power for said load and connected to a first input shaft, a source of alternating current subject to variations in frequency connected to said synchronous motor for energizing said motor, a second source of alternating current of constant frequency, means for comparing the frequencies of said current sources to provide a beat frequency difference voltage, and an auxiliary synchronous motor connected to be energized by said beat frequency voltage and coupled to a second input shaft of said differential.

3. A constant speed drive comprising a differential with two input shafts and an output shaft, a principal source of mechanical energy subject to variations in speed connected to one of said input shafts for driving said output shaft, means for generating an alternating voltage having a frequency proportional to the speed of rotation of said principal mechanical source, a constant frequency oscillator, means for comparing the output of said oscillator with said variable frequency alternating voltage to provide a beat frequency difference voltage, an auxiliary source of mechanical energy comprising a synchronous motor coupled to the second input shaft of said differential, and means for energizing said synchronous motor in response to said beat frequency voltage.

4. The invention as set forth in claim 3 wherein said synchronous motor and said mechanical source drive said input shafts in opposite directions.

5. The invention as set forth in claim 3 including a mechanical brake coupled to the shaft of said synchronous motor.

6. The invention as set forth in claim 1 wherein said constant frequency source includes a crystal controlled oscillator.

7. A constant speed drive comprising a differential with two input shafts and an output shaft, a principal source of mechanical energy subject to variations in speed connected to one of said input shafts for driving said output shaft, means for generating an alternating voltage having a frequency proportional to the speed of rotation of said principal mechanical source, means for producing a constant frequency voltage whose frequency differs from the frequency of said alternating voltage, means for combining said constant frequency voltage and said alternating voltage to produce a beat frequency voltage equal to their difference, and means for maintaining constant the speed of said load notwithstanding variations in the frequency of said alternating voltage comprising an auxiliary synchronous motor connected to the other input shaft of said differential, said motor being energized by said beat frequency voltage, the direction of rotation of said second input shaft being such that a change in the speed of rotation of said first input shaft is compensated by change in the speed of said second input shaft to thereby hold the speed of said load at a constant value.

8. A constant speed drive comprising a differential with two input shafts and an output shaft, a principal source of mechanical power subject to undesired variations in speed and connected to one of said input shafts for driving said output shaft, means for generating an alternating voltage having a frequency proportional to the speed of rotation of said principal source of mechanical energy, means for producing a constant frequency voltage whose frequency differs from the frequency of said alternating voltage, a detector for combining said voltages to produce a beat frequency voltage equal to their difference, an auxiliary synchronous motor connected to the other input shaft through a reduction gear, and means for driving said auxiliary motor in synchronism with said beat frequency voltage, the frequency of said beat frequency voltage and the ratio of said reduction gear being such that said other input shaft is driven at a speed lower than the speed of said one input shaft whereby said auxiliary motor provides less power to said output shaft than is provided by said principal source of power, the direction of rotation of said other input shaft being such that a change in the speed of said one shaft produces a resulting change in the speed of said other shaft which maintains constant the speed of said output shaft.

9. A device of the character described in claim 8 in which the frequency of said constant frequency voltage is higher than the frequency of said alternating voltage and the auxiliary motor drives said other input shaft in such a direction that the speed of the output shaft is equal to the sum of the respective speeds of said input shafts.

10. A device of the character described in claim 8 in which the frequency of said constant frequency voltage is lower than the frequency of said alternating voltage and the auxiliary motor drives said other input shaft in such a direction that the speed of said output shaft is equal to the difference between the respective speeds of said input shafts.

ALDA V. BEDFORD.
CARL A. MENELEY.

REFERENCES CITED

The following references are of record in the file of this patent:

UNITED STATES PATENTS

| Number | Name | Date |
| --- | --- | --- |
| 1,590,270 | Watson | June 29, 1926 |
| 1,521,205 | Stephenson et al. | Dec. 30, 1924 |
| 691,667 | Rowland | Jan. 21, 1902 |
| 1,753,331 | Clokey | Apr. 8, 1930 |
| 1,500,860 | Yo | July 8, 1924 |